United States Patent Office 3,745,128
Patented July 10, 1973

3,745,128
SODALITE-SUPPORTED CATALYST
Lee A. Cosgrove, West Chester, and James E. McEvoy, Springfield, Pa., assignors to Air Products and Chemicals, Inc., Allentown, Pa.
No Drawing. Filed Aug. 27, 1971, Ser. No. 175,747
Int. Cl. B01j 11/40
U.S. Cl. 252—455 Z
6 Claims

ABSTRACT OF THE DISCLOSURE

Catalyst bodies comprising 0.5–45% metallic component distributed throughout a matrix in which sodalite is the predominant crystalline form are prepared by mixing raw kaolin, a finely divided metallic component, and an aqueous solution of 40–50% sodium hydroxide, shaping such mixture into catalytic bodies, immersing the bodies in oil, heating the oil-immersed bodies at 65–115° C. for 1–24 hours to provide rugged sodalite-containing catalytic bodies, rinsing excess oil and/or sodium hydroxide from the bodies, heat-treating the rinsed bodies in a controlled atmosphere, and cooling the heated bodies. These have a narrow range of sizes of macropores, and serve as crush resistant catalyst for hydrogenation, oxidation, isomerization, cracking, and/or other conversion catalyzed by the selected metallic component.

BACKGROUND OF THE INVENTION (1) Field of the invention

The invention relates to crush-resistant catalyst bodies featuring 0.5–45% metallic component distributed throughout a matrix comprising crystalline sodium aluminodisilicate.

(2) Description of the prior art

Catalyst particles, whether of the monolithic, granular, or fluidizible size, desirably possess attrition resistance, crush resistance, and mechanical strength, but difficulty has been encountered in achieving such objectives. The matrix for a catalyst desirably has macropores having diameters of the 100–10,000 angstrom diameter range through which reactants may diffuse toward catalytic sites. Many matrix materials have a wide range of macropore sizes, notwithstanding the desirability of having most of the macropores within a relatively narrow range of sizes. Although molecular sieves have permitted catalyst technologists to achieve narrow ranges of micropore sizes, the efforts to avoid the propensity toward random or statistical distribution of macropore sizes have not been uniformly successful. The degree of narrowness of macropore size range has sometimes been expressed as the slope of the major portion of the distribution curve of macropore sizes. Although the goal of a matrix having the middle major portion of its macropore size distribution curve with a small slope has long been recognized as desirable, efforts to improve macroporosity have generally been remote from such goal.

Sodalite has been prepared from a significant variety of aluminosilicates, including kaolin. Example 1 of Mason 3,037,843 discloses preparation of basic sodalite by 19 hour treatment of raw kaolin in boiling 5.5% NaOH solution, and conversion of such sodalite to permutic acid. Weber 3,058,805 indicates that aluminosilicate nutrients tend to recrystallize to form basic sodalite if the NaOH concentration is greater than about 20%. Many crystalline sodium aluminodisilicates have much zeolitic water content and can be dehydrated to provide molecular sieve type of porosity aiding catalytic reactions. Dehydrated sodalite has a type of small pore porosity apparently unsuitable for catalytic reaction of mononuclear organic compounds. As used herein sodalite designates a material sometimes called hydroxy sodalite, basic sodalite, and the products derived therefrom by hydration-dehydration, and the composition containing NaCl is excluded.

SUMMARY OF THE INVENTION

In accordance with the present invention, a crush resistant catalytic body, such as a granular pellet or a fluidizible particle or a monolithic massive body, is prepared to contain from about 0.5% to about 45% by weight of active catalytic metal component distributed throughout a sodium aluminodisilicate matrix having basic sodalite as the principal crystalline component. A plastic precursor comprises aqueous 40–50% sodium hydroxde solution, the predetermined amount of metal component, and aluminosilicate consisting predominantly of raw kaolin. The plastic composition is shaped into the desired catalytic body, which is immersed in oil, and heated in the oil at about 65–115° C. for about 1–24 hours of aging to bring about formation of sodalite from the kaolin. The sodalite sometimes serves as a cement bonding together and/or encapsulating the particles of metal component. There may be some dissolving and reprecipitation of the metal component in the aqueous sodium hydroxide at the elevated temperature but some metal component particles are inert to the alkaline solution.

After the recrystallization of the bodies at about 65–115° C. for about 1–24 hours, the bodies are removed from the oil, and may be rinsed with solvents adapted to remove both the excess oil and any excess leachable sodium hydroxide. After the bodies are removed from oil, the particles are heat-treated in an atmosphere adapted to activate the metallic component, but this may be done in the reactor instead of at the catalyst plant. The age composition comprises a significant amount of water, the removal of which during heat-treatment serves to provide pores through the composition, thus overcoming the disadvantage of purified crystalline basic sodalite structure, in which the pore size is too small for most of the reactants of commercial interest. The aged composition includes amorphous aluminosilicate which may impart some of the superior pore characteristics even though most of the sodium aluminodisilicate content is basic sodalite. Most of the macropore volume is within a narrow range such as from about 700 to about 1800 angstroms, and this result might be explained on the theory of open network (instead of maximum density) growth of the recrystallized aluminodisilicate.

If a catalyst comprising metallic metal is desired, then hydrogen may be employed in the activation step for reducing metal oxide to metal. The heat-treatment should be at a temperature of at least 200° C., and desirably at a temperature above 300° C. and generally below 600° C. It is usually desirable to maintain the controlled atmosphere during the cooling of the bodies from the elevated temperature to about room temperature. The thus prepared particles have a porosity attributable in part to the loss of volatile matter during the heating, and are characterized by high initial activity for the weight of metallic component present. The crushing strength of the bodies is sufficient to permit the use of a deep bed of granular particles without crushing the particles at the bottom of the bed. The distribution of the macropores (i.e. pores having diameters from about 100 to 10,000 angstroms) is such that most of the pore volume (excluding 10–30% at each end of the curve) has a narrow range such as 600–2000 angstroms or 700–1800 angstroms.

Advantages are obtained by utilizing hydrated nickel hydroxide as the metal component and heat-treating the intermediate to provide a supported nickel catalyst. These catalysts have high activity for hydrogenation reactions.

Cobalt and iron, which are similar to nickel for some purposes, have catalytic properties which are distinguishable from those of nickel. The present invention permits production of sodalite-supported catalysts featuring cobalt and/or iron.

The finely divided powder of metal component is incorporated in the plastic composition predominantly by physical admixture. If any catalytic metal component which is decomposed by aqueous alkali is to be used, then such reaction must be completed prior to the incorporation of the desired component in the plastic mixture. The catalytic metals are defined as all metals of groups I–B, II–B, III–A, IV–A, IV–B, V–A, V–B, VI–A, VII–A, and VIII.

The invention is further clarified by reference to a plurality of examples.

DESCRIPTION OF PREFERRED EMBODIMENTS

A catalytic grade of raw kaolin, marketed as Minchem Special, was employed as the source of the aluminodisilicate. First there was the dry blending of 7.9 kilograms of the raw kaolin and 1.65 kilograms of the hydrated nickelous hydroxide. To the 9.55 kilogram of the dry blend, 3.5 kilogram of 50% aqueous sodium hydroxide were added while mulling in a Lancaster mixer and after about 50 minutes of mulling, the composition had a plasticity suitable for extrusion. The plastic composition was transferred from the Lancaster mixer to an extruder and extruded through a die having 2.4 millimeter diameter openings. The extrudate was sliced into pellets having a length to diameter ratio of approximately 2. The pellets were immersed in a mineral oil. A container of the oil immersed pellets was placed in an oven maintained at 95° C. for 24 hours. A minimized moisture loss from the pellets occurred during the hydrothermal treatment because the oil sealed the moisture within each pellet. The pellets were transferred to an aqueous solution of 36.7% sodium hydroxide. The pellets were treated in the gently boiling aqueous sodium hydroxide solution during 4 hours. The pellets were then washed 5 times in 10 liters of hot water. After washing, the pellets were dried at 250° F. X-ray diffraction measurements indicated that the matrix was high purity sodalite. Analysis of the catalyst revealed that it contained about 1.28% of material volatile at 105° C. The ignition loss was 8.8% for 2 hours at 1400° F. and 13.35% for 2 hours at 1800° F. The ratio of loss at 1800 vs. the loss at 1400 was 1.517. After calcination at 1800° F., the catalyst contained 11.89% NiO or 9.34% Ni as metal. The sodium content was 20.15% sodium as Na₂O. The silica content of the 1800° F. calcined product was 35.22%. The catalyst was heated in a hydrogen atmosphere at 560° C. to provide a catalyst containing approximately 10% nickel in a sodalite matrix.

The catalyst was tested for hydrogenation activity by directing the vapors of a mixture of 85% cyclohexane and 15% benzene together with hydrogen providing a mol ratio of 4 H₂ per mol of organic compound. The pressure was 400 p.s.i.g. The vapors flowed through the catalyst zone at a space rate of 50 liquid volumes of oil (mixture of cyclohexane and benzene) per volume of catalyst per hour. For the benzene reactant, the volumetric space rate was of the magnitude of 350 v.v.h., thus being too large for evaluating minor amounts of catalytic activity but permitting some distinctions amongst high activity catalysts to be observed and measured. Observations concerning percentage conversion permitted calculation of activity indices related to the first order rate constant. The pellets were quite resistant to crushing forces and had a crushing strength of 22 pounds.

The pellets were compared with a commercially available nickel on diatomaceous silica catalyst containing 56% nickel as nickel oxide.

|  | Control | Example I |
|---|---|---|
| Wt. percent Ni as NiO | 56 | 11.89 |
| Wt. percent sodalite | 0 | 88 |
| Crushing strength, pounds | 5 | 22 |
| Percent conversion of C₆H₆ | 82 | 79 |
| Activity index | 65 | 68 |

Although the catalyst of Example I had less than ⅕ of the nickel content of the control, its overall activity was equivalent. Moreover, the sodalite-supported catalyst had superior crush resistance.

EXAMPLE II

Following the general procedure of Example I, but aiming at the preparation of a catalyst containing about twice as much nickel, a plastic composition was prepared by mulling a mixture containing 6 kilograms of raw kaolin, 2.79 kilograms of hydrated nickelous hydroxide, and 3.311 kilograms of 50% aqueous sodium hydroxide. After calcination at 1800° F., the composition of the catalyst corresponded to 24.25% NiO, 14.88% Na₂O, 30.19% SiO₂, and 29.11% Al₂O₃. Expressing the nickel content as nickel instead of nickelous oxide, there was 19.06% nickel in the catalyst.

Example III

Following the general procedure of Examples I and II, a catalyst was prepared to contain a larger amount of nickel. The plastic composition was prepared from the mixture of 4 kilograms of nickel hydroxide, 4 kilograms of raw kaolin, and 3.95 kilograms of 50% sodium hydroxide. After the catalyst had been calcined at 1800° F., its analysis showed the presence of 40.30% NiO, 14.17% Na₂O, 22.96% SiO₂, and 22.97% Al₂O₃.

Examples IV–X

By a series of evaluations of alternatives to some of the features of Examples I–III, certain desirable features were established.

The aluminosilicate should consist predominantly of raw kaolin, but minor amounts, such as 5% or 9% of meta kaolin, analcite, or other suitable modifier, can be employed when desired.

The metal component should not adversely react with the concentrated sodium hydroxide solution, and is ordinarily an oxide, hydroxide, carbonate, formate, nitrate, oxalate, or the like. A salt which readily thermally decomposes to a catalytically active form of the metal may be used. Some powdered metals may be suitable metal components. Alkali metals such as potassium, aluminum, and alkaline earth metals such as calcium are excluded from the catalytic metal components because their oxides are not conventionally distributed upon a support for catalyzing vapor phase reactions. Catalytic metals are defined as all metals of groups I–B, II–B, III–A, IV–A and B, V–A and B, VI–A, VII–A and VIII.

The metal component must be finely powdered, mostly passing through 100 mesh screen, desirably through 400 mesh screen. Effective diameters less than about 37 microns for the major weight portion corresponds generally to the requirement for through 400 mesh screen.

The upper limit of metal component concentration in the final catalyst is 45% because a significant amount of sodium aluminosilicate matrix is necessary to achieve the rugged crush-resistant bodies of the present invention. Some powders are of low enough density that ruggedness is significantly impaired at concentrations well below 45%, so that in making NiO catalysts, it is desirable to set 40% NiO as a maximum for granular NiO particles designed for deep beds requiring crushing strengths greater than about 3 pounds. However, pellets for shallow beds can be industrially useful at crushing strengths of 3 pounds thus permitting preparation of useful pellets containing 40% or more nickel.

From the chemical viewpoint, the molar amount of Na₂O in the aqueous NaOH solution desirably should be at least equal to the molar amount of $Al_2O_3$ in the aluminosilicate (e.g. pure raw kaolin), and excess $Na_2O$ is desirable. The concentration of the caustic should be quite high, desirably about 50% and at least 40%. Weak pellets result from 25% NaOH solutions. The equation for sodalite formation requires a $Na_2O/Al_2O_3$ mole ratio of at least 1. However, such equation is ignored because the proportions of aqueous NaOH to aluminosilicate are regulated to achieve a plasticity suitable for the shaping step. Aqueous NaOH tends to act as a plasticizing agent and the pressurized rolling action of the Lancaster mixer further aids attainment of an extrudable composition with minimized water content. The external surface area of the metal component affects the water requirements. Use of water greater than necessary for achieving an optimum plasticity for the shaping step tends to decrease the crushing strength of the calcined body. The amount of aqueous 50% NaOH is approximately the summation of 40% of the weight of aluminosilicate and 50% of the weight of the metal component but is adjusted to achieve the plasticity appropriate for the shaping step, generally minimizing the amount of water.

Granular catalyst particles are often manufactured as pellets suitable for use in deep beds, and must be strong enough to withstand significant crusing forces and must be sufficiently granular to flow in a gravitating bed. Rotating discs permit formation of granular spheroidal particles. The combination of extrusion and slicing is a convenient method of preparation of granular catalyst particles. Freshly extruded pellets can be reshaped into spheroidal beads. Fluidizible particles can be formed and dispersed in oil by cutting freshly extruded pellets with rapidly rotating mixing blades immersed in oil. Massive bodies of the plastic composition can be shaped by procedures appropriate for ceramic production.

By a series of tests, it is established that the duration of aging of the oil-immersed bodies at ambient temperature appears to have little influence upon the measured properties of the sodalite catalysts, thus further distinguishing them from faujasite synthesis methods generally requiring prolonged ambient aging.

High boiling mineral oils for hot aging of aluminosilicate precursors for catalysts and sorbents are well known to catalyst technologists, and may also serve as the transfer liquid from extruder to the aging tanks. Pumps can circulate particle-free oil through a heat exchanger and upwardly through the bed for maintaining the temperature of the aging tank. Pellets can gravitate through an aging tank having the supply rate and withdrawal rate adjusted to achieve the desired residence time.

The use of benzene, tetrachloroethylene, or other suitable organic solvent for removing residual oil from the bodies was found to be advantageous, but certain catalysts were prepared omitting this step and relying upon the combination of aqueous alkali rinsing and air calcination combustion to remove the residual oils.

The freshly extruded pellets readily disintegrate in water, but after aging in hot oil, the cementing action of the sodalite strengthens the pellet enough to withstand rinsing with hot water. Such conversion of raw kaolin into a water-resistant structure without any calcination is quite contrary to conventional processing of kaolin bodies. The water-rinsed bodies can be dried at about 250° F. and subjected to analytical procedures of interest to researchers but not necessary for controlling the routine manufacturing procedure.

The proportion of the aluminosilicate converted to sodalite by several hours of hot oil immersion is generally within the range from about 51% to 95% and is desirably about 75%. Treatment of the oil-aged particles with sodium hydroxide solution for a suitable period (up to about a day) transforms the matrix into about 95% sodalite as indicated by measurements of porosity, volatile matter, bulk density crushing strength, and X-ray diffraction. Catalyst activity is not improved sufficiently by such formation of a matrix containing so much sodalite to justify the marginal cost of such processing. Particular attention is directed to the control of the aging step to achieve a matrix which is predominantly basic sodalite but which contains measurable amounts of amorphous sodium aluminosilicate. The residual unreacted amorphous aluminosilicate appears to impart advantageous crushing strength to the catalyst. Certain differences in the bulk density, crush resistance, and other properties were noted while establishing the 51–95%, desirably 70–80% preferably about 75% sodalite content for the matrix of the catalyst.

Hydrogen atmospheres promoted reduction of the metallic component during the heat-treatment step. Variations in time from 6 to 40 hours and from 950 to 1050° F. in temperature appeared to have no effect upon the hydrogenative treatment.

The data relating to several catalyst preparations are set forth in the following tables.

TABLE CONCERNING PERFORMANCE OF Ni ON SODALITE CATALYSTS

| Example | Percent Ni | Hours of aging treatment | | | Benzene conversion wt. percent |
|---|---|---|---|---|---|
| | | Ambient | 200° F. | Aqueous | |
| IV | 10 | 0 | 24 | 24 | 75 |
| V | 10 | 0 | 8 | 0 | 77 |
| VI | 10 | 24 | 24 | 0 | 67 |
| VII | 21 | 0 | 24 | 0 | 82 |
| VIII | 20 | 0 | 8 | 0 | 90 |
| IX | 20 | 0 | 24 | 24 | 86 |
| X | 40 | 0 | 8 | 0 | 91 |

TABLE CONCERNING PHYSICAL PROPERTIES OF Ni ON SODALITE CATALYST

| Example | Sodalite as percent of matrix | Crushing strength, pounds | Packed bulk density, kl./l. |
|---|---|---|---|
| V | 51 | 26 | 0.809 |
| VI | 55 | 27 | 0.823 |
| VIII | 59 | 24 | 0.740 |
| X | 52 | 4 | 0.811 |

Various modifications of the hydrogen-treated catalyst are possible. Its pyrophoric propensities can be modified by immersion in a viscous oil, or by controlled oxidation in a 99% $N_2$ 1% $O_2$ atmosphere.

Example XI

Hydrated nickelous hydroxide is fluidized in a reactor using hydrogen as a component of the fluidizing gas at about 300° C. to provide metallic nickel powder having a maximum particle size less than about 37 microns, thus passing a 400 mesh screen. A cold hydrogen atmosphere is provided during the formation of the plastic composition consisting of said metallic nickel powder, aqueous sodium hydroxide, and a blend of 95% raw kaolin and 5% meta kaolin and during the formation of granular spheroids on a rotating disc, and immersion in oil. Proportions are regulated to attain about 33% NiO in the oxidized catalyst. The oil-immersed spheroids are maintained at about 65° C. for about 24 hours to convert about 73% of the matrix to sodalite. After rinsing the spheroids with hydrocarbon and water, and heating in hydrogen at 400° C. for 4 hours, the catalyst particles are cooled in nitrogen to about 200° C. A mixture of about 1% oxygen and 99% nitrogen is employed to oxidize the pyrophoric nickel spheroids to particles containing about 33% nickelous oxide.

Example XII

A supported FeO catalyst is prepared from 400 mesh metallic iron powder following the general procedure of Example XI. The high boiling organic liquid used for hot aging is conveniently designated as an oil.

Example XIII

A series of catalysts are prepared containing about 15% by weight of catalytic metal oxide powder in a matrix comprising a major amount of sodalite and a significant amount of amorphous sodium aluminosilicate, following the procedures of Examples II–X, but substituting metal oxides and/or mixtures of metal oxides for the hydrated nickelous hydroxide. The major portion of the powdered metallic component passes through a 100 mesh screen. Lanthanum molybdate, copper manganite, zinc stannate, cerium vanadate, bismuth chromite, and platinum type catalysts are thus prepared to take advantage of the useful combination of activity, stability, selectivity, and crushing strength of the catalysts. Said metal oxides are members of Groups III–A, VI–A, I–B, VII–A, II–B, IV–B, IV–A, V–A, V–B, VI–A, and VIII, respectively, and illustrate the usefulness of the matrix for all the metal components of said groups.

Example XIV

Freshly extruded pellets comprising about 15% $CoMoO_4$ in wet alkalized raw kaolin are oil immersed and subjected to a high speed rotating knife type mixer, thus forming spheroidal particles having a size range from about 15 to about 150 microns, and directed to a gently stirred zone in which oversize particles settle out from the dispersion. The dispersion is transferred to the hot aging zone and maintained at 115° C. for 2 hours to provide attrition resistant fluidizible particles of precursors for supported cobalt molybdate catalyst. After solvent washing and air calcination, the fluidizible catalyst is effective in any of several reactions benefitting from catalysis by a mixture of oxides of molybdenum and cobalt.

Example XV

A plastic composition comprising 90 parts of raw kaolin, 10 parts of meta kaolin, 25 parts of manganous oxide, and 45% NaOH solution is molded into a monolithic block having a plurality of round tubular passageways about 1 mm. in diameter, and the molded block is immersed in an organic liquid containing a major amount of polynuclear aromatic hydrocarbon, heated to about 85° C., and maintained at the hot temperature for about 10 hours. The thus recrystallized catalyst body is subjected to the solvent washing, calcining, and cooling to provide a monolithic catalyst block having an advantageously high crushing strength.

Various modifications of the invention are possible without departing from the scope of the claims.

What is claimed is:

1. In the method of preparing crush resistant catalyst bodies featuring from about 0.5% to about 45% catalytic metal component distributed in a porous matrix, the improvement which comprises:
   preparing an aqueous sodium hydroxide solution containing from 40 to 50% sodium hydroxide;
   admixing a controlled amount of finely divided catalytic metal component particles predominantly smaller than 100 mesh, and aluminosilicate powder with said solution to provide a plastic composition, the aluminosilicate powder consisting predominantly of raw kaolin, the catalytic metal component being selected from metal components of groups I–B, II–B, III–A, IV–A, IV–B, V–A, V–B, VI–A, and VIII;
   shaping the plastic composition into appropriate bodies;
   immersing the bodies in oil;
   heating the oil-immersed bodies at a temperature from about 65° C. to about 115° C. for from about 1 to about 24 hours to transform a major portion of the aluminosilicate to basic sodalite;
   removing the sodalite-containing bodies from the oil;
   rinsing the bodies to extract oil and readily leachable sodium hydroxide;
   heating the rinsed bodies at a temperature above 200° C. activating the catalytic metal component; and
   cooling the heated bodies for use as catalyst bodies characterized by a controlled amount of activated metal component within the 0.5–45 weight percent range distributed throughout a matrix featuring sodalite as the predominant crystalline component, most of the macroporosity of the bodies having pore diameters from about 600 to about 2000 angstroms.

2. The method of claim 1 in which the oil-immersed bodies are heated at about 95° C. for a period from about 6 to about 24 hours.

3. The method of claim 1 in which the metallic component is hydrated nickelous hydroxide.

4. The method of claim 1 in which the aluminosilicate powder is at least 90% raw kaolin, the balance being meta kaolin.

5. Calcined dehydrated catalyst bodies having a crush resistance greater than 3 pounds, most of the macroporosity of the 100–10,000 angstrom diameter range being within a narrow size range near 1100 Angstroms, said catalyst bodies having from 0.5% to 45% by weight of a catalytic metallic component of the groups I–B, II–B, III–A, IV–A and B, V–A and B, VI–A, VII–A and VIII, said catalyst bodies having from 90 to 55% matrix consisting of sodium alumino-disilicate, from about 51% to about 95% of the matrix being sodalite and from about 5 to 49% of the matrix being amorphous sodium aluminodisilicate.

6. Catalyst bodies of claim 5 in which the catalytic metallic component is metallic nickel.

References Cited

UNITED STATES PATENTS

| | | | |
|---|---|---|---|
| 3,037,843 | 6/1962 | Mason | 23—112 R |
| 3,322,690 | 5/1967 | Bilisoly | 252—455Z |
| 3,373,109 | 3/1968 | Frilette et al. | 252—455 Z |
| 3,515,684 | 6/1970 | McEvoy | 252—455 Z |

CARL F. DEES, Primary Examiner